United States Patent [19]

Mezzanotte

[11] 4,166,491
[45] Sep. 4, 1979

[54] RADIAL PNEUMATIC TIRES HAVING REINFORCED SIDEWALLS

[75] Inventor: Mario Mezzanotte, Milan, Italy
[73] Assignee: Industrie Pirelli, S.p.A., Milan, Italy
[21] Appl. No.: 784,468
[22] Filed: Apr. 4, 1977
[30] Foreign Application Priority Data

Apr. 6, 1976 [IT] Italy .................................. 21953 A/76

[51] Int. Cl.² .............................................. B60C 9/02
[52] U.S. Cl. .......................... 152/354 R; 152/353 R; 152/356 R
[58] Field of Search ........... 152/354, 361 DM, 362 R, 152/362 CS, 357 R, 356 R, 353 R

[56] References Cited
U.S. PATENT DOCUMENTS

| | | | |
|---|---|---|---|
| 2,958,360 | 11/1960 | Macklem et al. ................ | 152/354 |
| 3,442,315 | 5/1969 | Mirtain .......................... | 152/356 R |
| 3,480,065 | 11/1969 | Verdier .......................... | 152/353 R |
| 3,480,065 | 11/1969 | Verdier .......................... | 152/354 X |
| 3,481,386 | 12/1969 | Menell et al. ................... | 152/354 |
| 3,612,138 | 10/1971 | Ravenhall ....................... | 152/362 R |
| 3,625,271 | 12/1971 | Hutch ............................. | 152/354 |
| 3,783,925 | 1/1974 | Boileau .......................... | 152/354 X |
| 3,850,219 | 11/1974 | Snyder ........................... | 152/361 DM |
| 3,853,163 | 12/1974 | Mezzanotte et al. ............ | 152/362 R X |
| 4,047,551 | 9/1977 | Mezzanotte ..................... | 152/362 R X |

Primary Examiner—Joseph F. Peters, Jr.
Assistant Examiner—D. W. Underwood
Attorney, Agent, or Firm—Stevens, Davis, Miller & Mosher

[57] ABSTRACT

A pneumatic tire for a vehicle has a carcass made from cords with the ends of the cords turned up around the beads of the tire. The crown of the tire has a tread and a reinforcing breaking structure. The breaker structure has three layers of cords superimposed one over the other with the width of the inner most layer being larger than the width of the next adjacent layer. The cords in each of the inner most and next adjacent layers are parallel to each other and are inclined at an angle of about 10° to 35° with respect to the equatorial plane of the tire. The cords of the innermost layer are extended in one direction and cross those of the next adjacent layer. A third layer of cords is disposed between the tread and the said next adjacent layer. The cords in this third layer are of a textile material which will shrink with increase in temperature. The cords in the third layer are parallel to the equatorial plane of the tire and the width of the third layer is smaller than that of the said next adjacent layer. The sidewalls of the tire are reinforced with a layer of cords disposed axially outwardly from the carcass with one of its edges being disposed adjacent to the bead of the tire and axially outwardly from the turned up portion of the carcass. The other edge of the reinforcing structure in the sidewall is disposed between the third and the said next adjacent layers of the breaker structure. The cords in the reinforcing layer are inclined at an angle of 55° to 15° with the equatorial plane of the tire. The angle of inclination of the cords in this layer decreases as the fibers become more further removed from the edge of the structure which is adjacent to the bead.

4 Claims, 4 Drawing Figures

RADIAL PNEUMATIC TIRES HAVING REINFORCED SIDEWALLS

The present invention relates to radial tires, i.e., to tires provided with a carcass having layers of textile or metallic cords, in which the cords lie on radial planes or form small angles with the planes, and more particularly, it concerns an improvement to such tires in order to make them more steady during running and particularly suitable for use at high speeds.

As is known, radial pneumatic tires are usually provided with an annular reinforcing structure (the so-called "breaker") arranged between the carcass and the tread, for the purpose of withstanding the stresses which arise in the tire, either because of the inflation pressure, or chiefly because of strains applied to the tire and to the deformations to which this latter is subjected in use.

A breaker particularly able to withstand the high stresses developed in a tire used for high speeds is known. This breaker has a pair of metallic cord layers in which the cords are parallel to one another in each layer and crossed with respect to those of the adjacent layer, inclined according to an angle relatively low with respect to the equatorial axis of the tire (from 10° to 35°) and at least one strip of textile cords orientated in the circumferential direction of the tire which shrink in length when subjected to heat (such as nylon), the strip being arranged in a radially outer position with respect to the layers.

The sidewalls of radial tires, even if provided with the aforesaid breaker, deform substantially, both in the radial and in the transverse direction. These tires provide good riding comfort because of their deformability in the radial direction. However, the tires behave unfavorably if they deform in the transverse direction.

If the tire deforms to a large extent in the transverse direction the deformed tire will be under external strains which act in planes normal to the equatorial one (particularly when the vehicle runs along a curved trajectory). Such deformed configuration produces high stresses in the tire, but above all, it leads the sidewall of the tire into contact with the rolling plane, with the consequence of reduced steering response and grip on the running surface.

The stiffness of radial tires, moreover, lacks continuity when passing from the tread zone to the sidewalls. This is due to the different structure (number of cord layers and cord orientation of the layers) of the two zones. It follows that, if the tire is utilized on very fast vehicles, damages involving detachments of the cord layers or in abnormal stresses arising in the layers can easily occur in the tire. In fact, it is known that if the frequency of the tire deformation is very high, which happens when the tire is used at high speeds, real dynamic waves are generated which cyclically deform particularly in the transition zone between the sidewalls and the tread with the development of stresses and heat.

Also, in a radial tire there is a notable difference between the sidewall and the tread in bearing the mechanical stresses to which the tire is in any way subjected if this latter is utilized at very high speeds. This is because of the higher mechanical resistance of the tire breaker in respect to the carcass. In such conditions the degrees of safety of the tread zone and of the sidewall zones, which are a little different when the tire works in normal conditions, become very different.

In order to reduce the above-indicated drawbacks, it has been proposed to stiffen the sidewalls of a radial tire utilizing reinforcing structures constituted, in some cases, by strips of textile or metallic cords (the so-called "flippers") which are arranged around the bead cores and extend radially from the bead as far as one-half the height of the tire section. These reinforcing structures, or other analogous ones arranged in other sidewall zones in order to achieve the same result, have, however, the drawbacks, in some cases of reducing both the transverse and radial deformability of the tire. This results in reduction in riding comfort. In other cases, the flippers do not eliminate or at least do not reduce the discontinuities of stiffness and of mechanical resistance between sidewalls and tread. In still other cases, they give rise to tires which have both of the aforesaid unfavorable effects.

The present invention aims to provide a tire for vehicle wheels devoid of the aforesaid drawbacks and therefore suitable to be used also at very high speeds, although keeping the ride comfort and the handling characteristics very satisfactory.

According to the invention a pneumatic tire for vehicle wheels is provided which has a radial carcass made up of at least one layer of cords lying in planes substantially radial, a tread and a breaker arranged between the carcass and the tread and comprising at least two super-imposed cord layers, the cords being inclined at an angle between 10° and 35° with respect to the equatorial plane of the tire and being parallel to one another in any layer and crossing those of the adjacent layer, the breaker comprising, moreover, in a radially outer position with respect to the two layers, at least one strip of cords of textile material which shrinks in length when subjected to the action of heat, the cords being arranged in parallel position to the equatorial plane of the tire, characterized by the fact that it further comprises in each tire sidewall, a reinforcement constituted of at least a cord layer arranged in an axially outer position to the carcass, the radially innermost edge of the reinforcing layer being substantially in correspondence with the bead core of the relative sidewall and axially external of the turned up portion of the carcass which is wound around the bead core, a radially outer stretch of the reinforcing layer being disposed in the breaker between the two super-imposed cord layers and the strip which has the cords arranged in a parallel position to the equatorial plane of the tire, each cord of the reinforcing layer being inclined with respect to the circumferential lines of the tire at an angle which decreases along the path of the cord from the radially innermost edge toward the stretch and variable in a range whose extreme values are 55° and 15°.

For a better understanding of the present invention, a description of some of its embodiments will be given, with reference to the attached sheets of drawings, in which.

Figure 1:
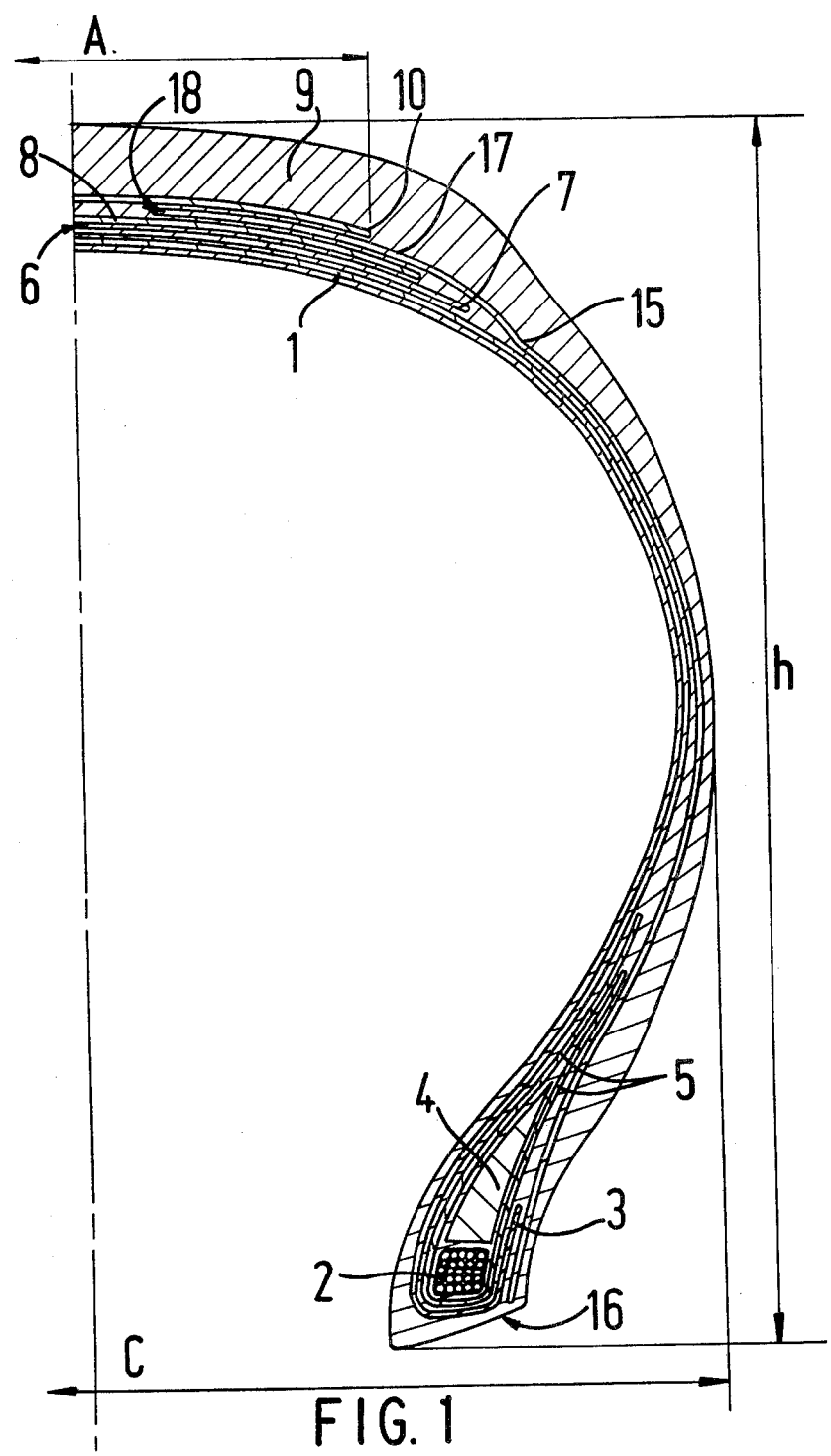
FIG. 1 is a partial section in the radial plane of one embodiment of the invention.

With reference to FIG. 1 of the drawing, the radial tire according to the invention has a carcass 1 formed of at least one layer of nylon cords 3 lying in radial planes which are turned up around the bead cores 2 from the inside toward the outside, the turned up portion of 3 extending radially in the bead zone.

Conveniently, an elastomeric material 4 fills the space above each bead core, between the overlapping portions of cords 3. The filling material 4 is that conventionally used in radial tires. It has a high hardness of for instance 90° Shore A. Moreover, a cord flipper member 5 is wound as usually done around each bead core 2 and between the filler 5 and the carcass ply of cords 3. The flipper member 5 is a strip of textile cords disposed parallel to one another and inclined with respect to the circumferential lines of the tire. The preferred angle of inclination of the textile cords in the flipper member is about 35°.

The tire is also provided with a breaker member 6 constituted by two layers of cords 7 and 8 disposed one over the other in the crown portion of the tire. The width of the breakers is about equal to the width of the tread 9. A cord strip 10 is arranged in a radially outer position with respect to the two layers of cords 7 and 8. Conveniently, the widths of the two layers 7 and 8 and of the strip 10 are different with strip 10 being narrower than strip 8 which in turn is narrower than strip 7 as shown in FIG. 1. This provides for gradual decreasing in thickness of the reinforcing textile layers in the zones where the tread joins the sidewalls of the tire.

The cords of the layers 7 and 8 can be metallic or textile; in the second case they are preferably of an aromatic polyamide, such as aramide. The cords of the strip 10 are made of a textile material which shrinks and reduces in length when subjected to heat and is preferably a polyamide, such as nylon.

The cords of each layer 7 and 8 are parallel to one another and inclined at an angle of between 10° and 35° with respect to the equatorial plane of the tire. Moreover, the cords of each layer are disposed symmetrically to the cords of the other layers, in respect to the above plane, to provide a structure in which the cords of layer 7 cross those of layer 8. The cords of the strip 10 are parallel to one another and are disposed in a direction which is substantially parallel to that of the equatorial plane of the tire.

A layer of cords 15 is arranged in a position axially outwardly of the carcass in each tire sidewall to reinforce the sidewall. The radially innermost edge 16 of layer 15 is disposed at a position which is substantially adjacent to a bead core 2 and is spaced axially outwardly of the turned up portion of the carcass 3 while a radially outer stretch 17 of the layer 15 is inserted between layer 8 and cord strip 10 of the breaker, as clearly represented in FIG. 1. The width of the reinforcing stretch 17 which is disposed between layer 8 and strip 10 can vary, but it is preferably equal to about ⅓ of the width of the cord strip 10 as indicated with A.

The cords of the reinforcing layer 15 are parallel to one another and each of them is inclined with respect to the circumferential lines of the tire at an angle decreasing along the path of the cord, from the radially inner edge 16 to the radially outer one 18. The variation in the inclination is conveniently within a range whose extreme values are 55° and 15°. For a well defined geometrical tire, i.e. one having a pre-fixed ratio h/c, i.e. the ratio between the height and the maximum width of the tire section, it is convenient that the aforesaid angles vary in a more limited range, depending upon the ratio. For values of high h/c it is convenient to choose ranges within the one indicated above, whose extreme values are rather high and close to each other. For values of low h/c it is suitable instead to choose ranges whose extreme values are also low.

For instance, for ratios h/c between 0.70 and 0.80 and between 0.30 and 0.50 it is better to choose ranges of values which are, respectively, between 55° and 45° and between 45° and 15°. The reason for which it is better to choose the ranges with the above criterion is due to the considerable variation that the angles of cords of the reinforcing layer 15 undergo during the building of the tire. The higher the ratio h/c is, the more pronounced is the variation and therefore it is more difficult to control the variation so it is constant in all the cords of the layer.

Figure 2:
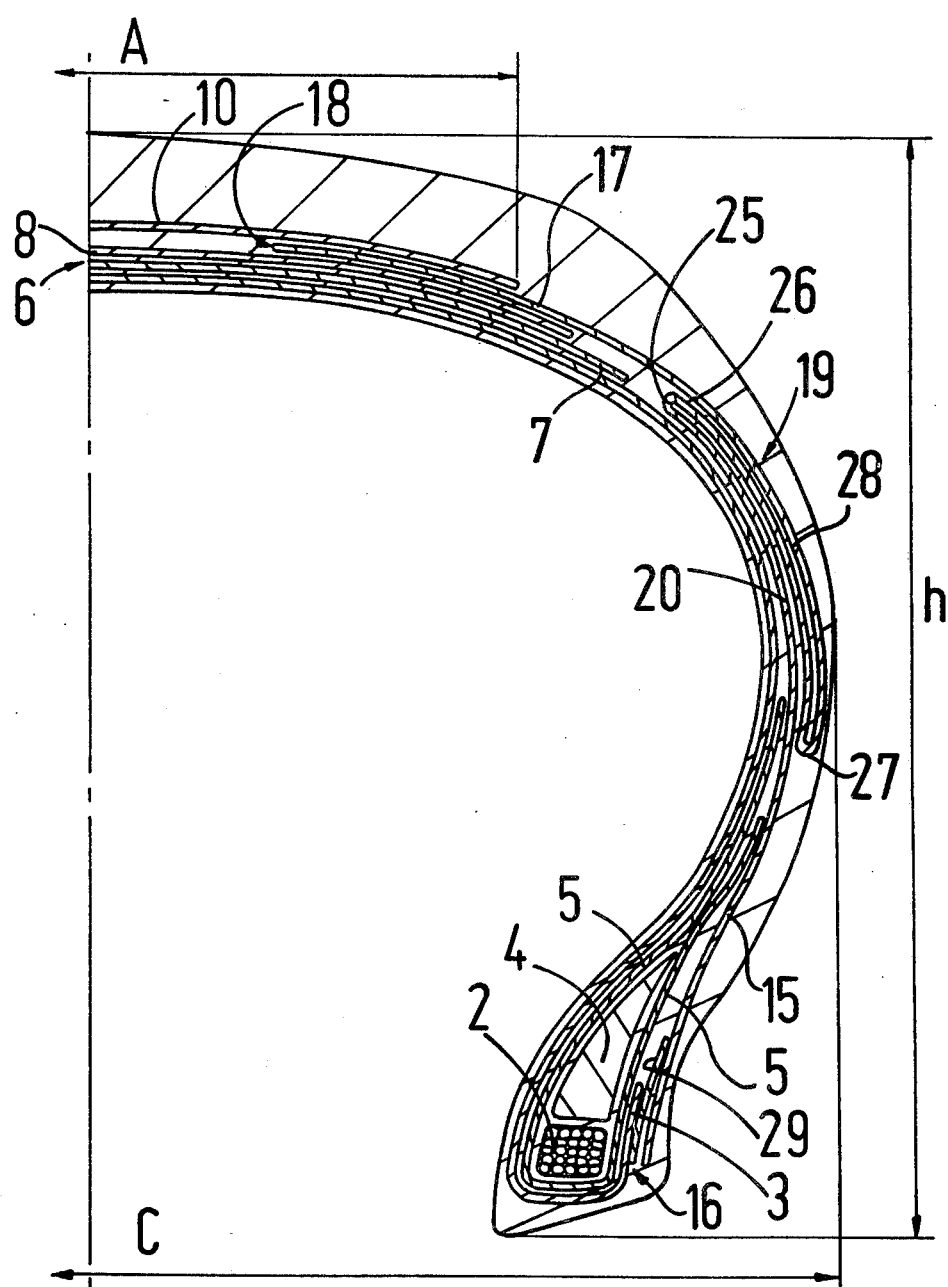
FIG. 2 is a partial section in a radial plane of a second embodiment of the invention.

The embodiment illustrated in FIG. 2 differs from the former by the fact that each reinforcing layer 15 is folded twice in order to form a portion 19 comprising substantially three superimposed skirting layers of cords. A first skirting layer 20 extends substantially from the radially inner edge of layer 16 to a first folded edge 25, positioned at the edges of the breaker layers 7 and 8. A second skirting layer 26 is superimposed on layer 20 and extends from the folded edge 25 to a second folded edge 27 which is radially inward of the first one.

At last, a third skirting layer 28, superimposed on the other two, 20 and 26, extends from the edge 27 as far as a radially outermost position to be disposed between the layers 7 and 8 and the strip 10 of the breaker. Also in this case, between the layers 7, 8 and strip 10 there is a stretch 17 of the skirting material 28 having a pre-fixed width.

Figure 3:
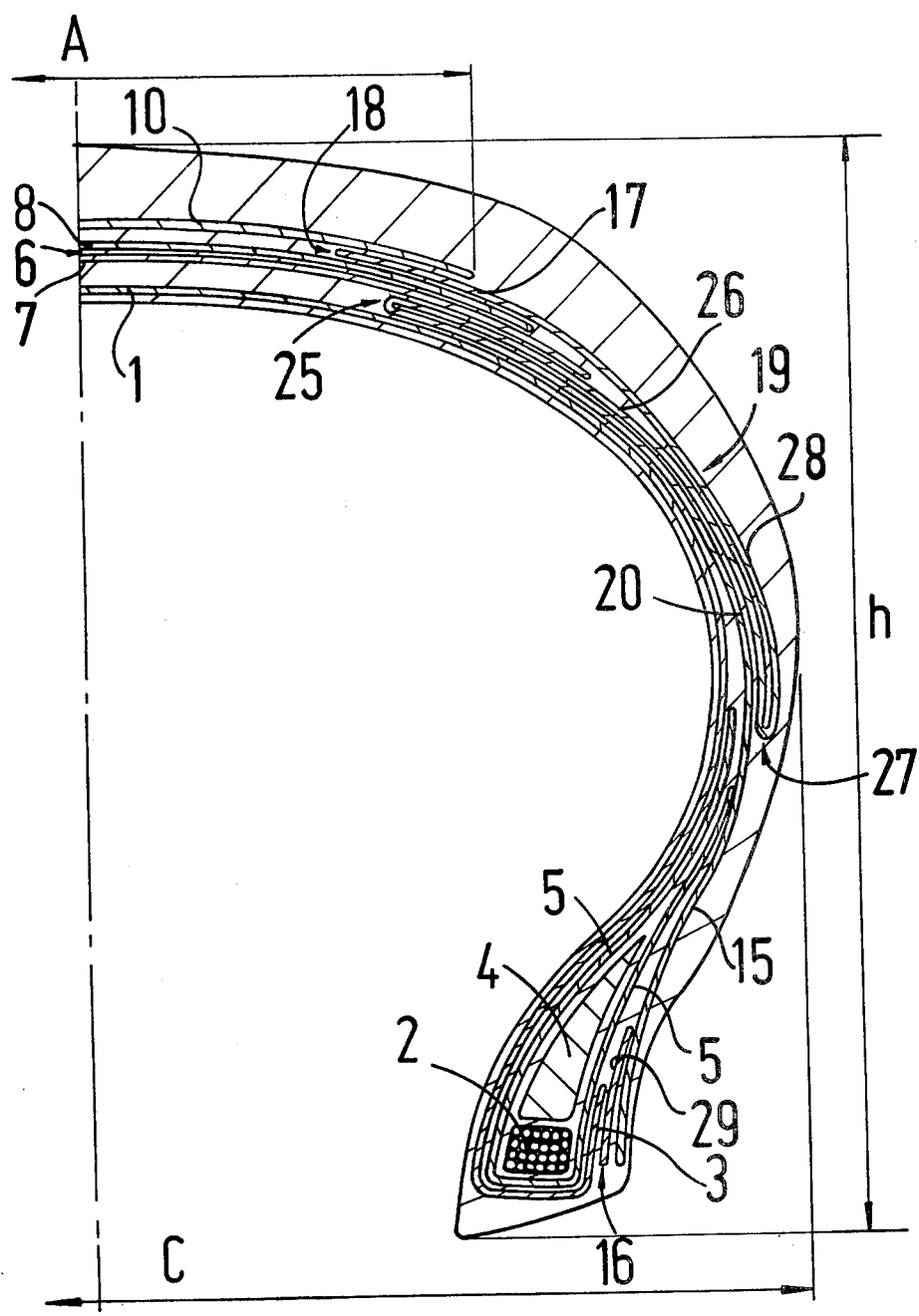
FIG. 3 is a partial section in a radial plane of a third embodiment of the invention.
Figure 4:
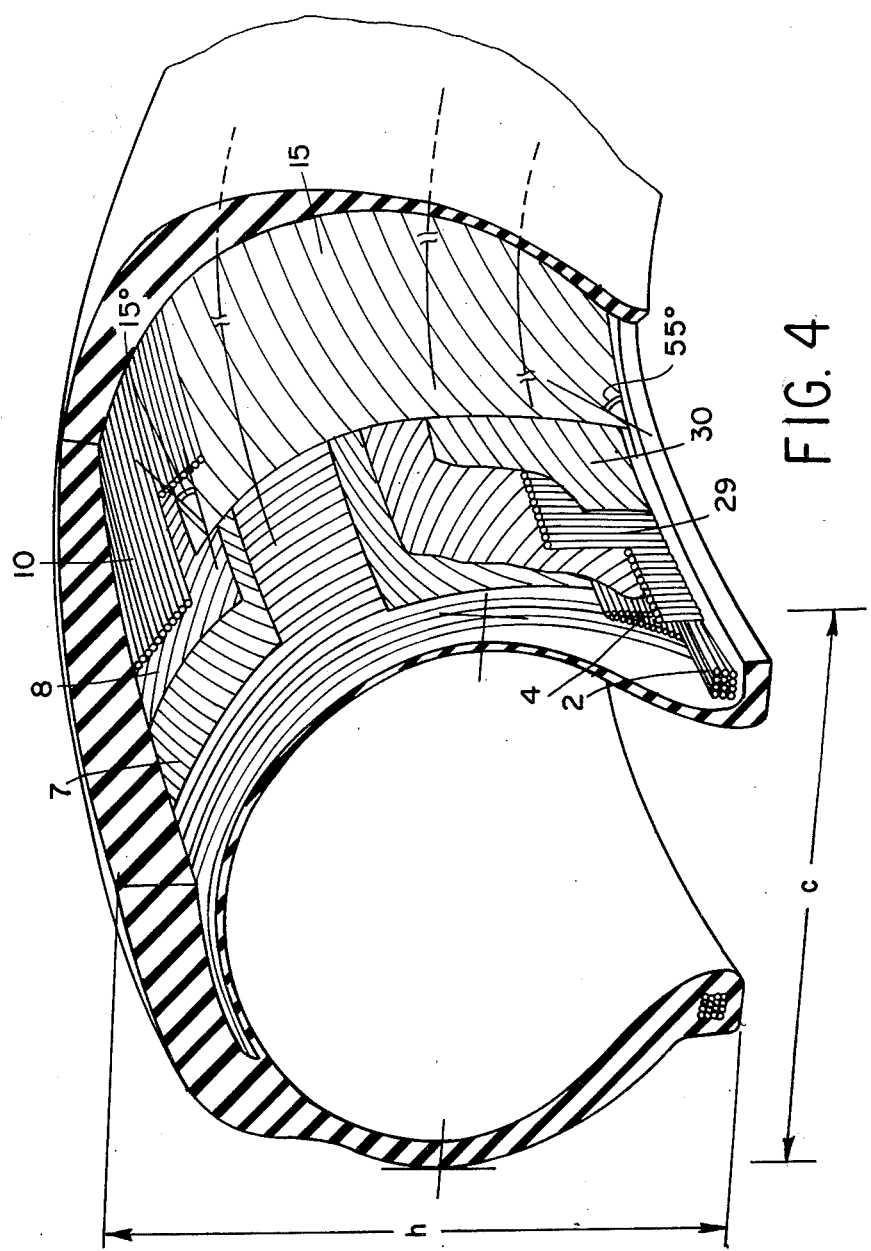
FIG. 4 is a perspective view partially in section illustrating the variable angle pattern in the reinforcing sidewall structure and the angles of the breaker cords of an embodiment of the invention.

The embodiment indicated in FIG. 3 differs from that just described only by the fact that the folding of the reinforcing layer 15 is made so that a part of the skirt members 20 and 26 and the folded edge 25 are disposed between the carcass 1 and the breaker layers 7 and 8. Even if the width of the inserted portion can be as desired, it is better that the folded edge 25 is in an axially outermost position with respect to the radially outer edge 18 of the reinforcing layer 15, in order to originate a certain graduation between the edges.

Conveniently, but not necessarily, in each of the tires of the three embodiments described, an additional strip of cords 29 (FIGS. 2 and 3) can be arranged at the bead; the cords of the additional strip are parallel to one another and oriented in a radial sense, as the cords of the carcass. The additional strips 29, known per se, have the function of stiffening the bead zone and limiting the deformability of each tire sidewall.

Otherwise, in each of the tires of the three above described embodiments, a strip of metallic cords (not represented), arranged in axially outer position with respect to the carcass and the turned up portions of this latter, can be placed at each bead. The metallic cord strip can extend conveniently radially from the bead cores zone to a height between 25% and 45% of the section height of the tire and it can be arranged substantially along the lines of the bending neutral axis of the tire sidewall. Each metallic cord of the strip is inclined with respect to the circumferential lines of the tire at an angle which decreases along the path of each cord, from the bead toward the tread and between 15° and 5°.

A strip of the indicated type has the function too of stiffening the bead zone and the radially innermost zone of the tire sidewall, limiting the deformability in the circumferential direction without reducing notably the one in the radial direction and therefore the comfort of the ridge.

The strip of the described type can be utilized alone or in combination with a strip of the type indicated with reference 29; in this latter case the first is arranged between the carcass and the second strip.

The behavior of the described tire in use is the following; at first the tire of the embodiment of FIG. 1 is considered.

The reinforcing layers 15 reduce the tire deformability in the transverse direction, without appreciably reducing it in the radial direction. This notably improves the steering response and the grip characteristics which are dependent upon the deformability in the first direction without reducing the ride comfort which is dependent instead upon the deformability in the second direction. In fact, the cords of the reinforcing layers 15 form angles which increase little by little with respect to the cords of the carcass 1, passing from the bead to the tread, for which the stiffness of the sidewall structure is increased at the tire shoulders, where it is advantageous to reduce the transverse deformability of the tire.

Moreover, because of the stretch 17 of each reinforcing layer 15 which is disposed between the layers 7 and 8 and the strip 10 of the breaker, the discontinuity of the stiffening between tread and sidewalls is greatly reduced.

In other words, a real continuous structure comprising the breaker 6 and the reinforcing layers 15 of the sidewalls is obtained in the tire according to the invention. This results in avoiding damages at the shoulders of the tire due to detachments of cord layers or to abnormal stresses. The advantages deriving from this gradual stiffness variation, passing from the tread and sidewalls, are particularly appreciable if the tire is used at high speeds.

The behavior of the tires corresponding to the embodiments of FIGS. 2 and 3, is not different from that described with respect to the tire of FIG. 1. The stiffness variation in these tires is still more gradual passing from the tread and from the upper zone of the sidewalls to the beads because of the presence of portions 19 of the reinforcing layers 15, comprising the superimposed skirt members 20, 26 and 28. It is in fact evident that the cords of each of the above skirts form a pre-fixed angle with the cords of the adjacent skirts and stiffen portions 19.

A closer connection is obtained between the reinforcing layer 15 and the breaker 6 with the portion 19 of the layer being substantially a continuation of the breaker into the sidewalls in the tire of FIG. 3. In the tire of FIG. 3, the portion 17 of skirt layer 26 is disposed between layer 8 and strip 10 and a part of skirting 20 is disposed between layer 7 and the carcass of the tire.

Although the invention has been described in detail for the purpose of illustration, it is to be understood that such detail is solely for that purpose and that variations can be made therin by those skilled in the art without departing from the spirit and scope of the invention except as it may be limited by the claims.

What is claimed is:

1. In a pneumatic tire for vehicle wheels comprising a radial carcass constituted at least by one layer of cords lying on substantially radial planes, a tread and a breaker arranged between the carcass and the tread and comprising at least two superimposed cord layers, said cords being inclined at an angle between 10° and 35° with respect to the equatorial plane of the tire and being parallel to one another in any layer and crossing those of the adjacent layer, said breaker comprising further, in a radially outer position with respect to said layers, at least a strip of cords of textile material which shrinks in length with increase in temperature, said cords being arranged in a position parallel to the equatorial plane of the tire, and in each tire sidewall, a reinforcement of at least one cord layer arranged in an axially outer position to the carcass, the radially innermost edge of said reinforcing layer being disposed substantially adjacent to the bead core of the relative sidewall and axially outer to the turned up portion of the carcass wound about said bead core and a radially outer stretch of said reinforcing layer being disposed in said breaker between said two superimposed cord layers and said cord strip having the cords arranged in a position parallel to the equatorial plane of the tire, each cord of the reinforcing layer being inclined with respect to the circumferential line of the tire at an angle decreasing along the path of the cord from said radially innermost edge toward said stretch and variable in a range whose extreme values, chosen on the ground of the ratio h/c between the height and the maximum width of the tire section (ranging between 0.30 and 0.80), are 55° and 15°, the improvement wherein said cord layer of said reinforcement is folded twice, so as to have a first skirting extending substantially from said radially innermost edge to a first folded edge arranged at the tire shoulder, a second skirting superimposed on the former and extending from said first folded edge to a second folded edge radially innermost to the former, and a third skirting superimposed on the other two and extending from said second folded edge to a position radially outermost to the latter in order to be disposed in said breaker between said two superimposed cord layers and said cord strip having the cords arranged in a position parallel to the equatorial plane of the tire.

2. The pneumatic tire of claim 1 wherein said first folded edge is substantially in proximity of the edges of said superimposed cord layers of the breaker.

3. The pneumatic tire of claim 1 wherein said first folded edge and the radially outermost portion of said first and second skirt members are disposed between said two superimposed cord layers of the breaker and said carcass.

4. The pneumatic tire of claim 1 wherein said second and third skirt members are in an axially outer position, with respect to said first and second skirt members, respectively.

* * * * *